US012567192B2

(12) United States Patent
Leyton et al.

(10) Patent No.: US 12,567,192 B2
(45) Date of Patent: Mar. 3, 2026

(54) COMPUTER-IMPLEMENTED METHOD FOR CONTROLLING A VIRTUAL AVATAR

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB); Cesare Sivo, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 111 days.

(21) Appl. No.: 18/557,349

(22) PCT Filed: Apr. 28, 2022

(86) PCT No.: PCT/GB2022/051074
§ 371 (c)(1),
(2) Date: Oct. 26, 2023

(87) PCT Pub. No.: WO2022/229639
PCT Pub. Date: Nov. 3, 2022

(65) Prior Publication Data
US 2024/0221270 A1      Jul. 4, 2024

(30) Foreign Application Priority Data
Apr. 28, 2021    (GB) ..................................... 2106038

(51) Int. Cl.
*G06T 13/40* (2011.01)
*A63F 13/213* (2014.01)

(52) U.S. Cl.
CPC ............ *G06T 13/40* (2013.01); *A63F 13/213* (2014.09)

(58) Field of Classification Search
None
See application file for complete search history.

(56) References Cited

U.S. PATENT DOCUMENTS 6,052,471 A  *   4/2000  Van Ryzin ............. H04B 1/207
                                                            369/2
2013/0290446 A1* 10/2013  Blattner ................ H04L 51/046
                                                            345/473
(Continued)

FOREIGN PATENT DOCUMENTS

EP            3588491 A1      1/2020
EP            3686850 A1      4/2020
WO       2015192117 A1      12/2015

OTHER PUBLICATIONS

Malleson et al.; "Mission Driven Virtual Character for User Interaction;" 2017 IEEE Virtual Reality (VR) Mar. 18-22, 2017, Los Angeles, CA, USA (Year: 2017).*
(Continued)

*Primary Examiner* — Edward Martello
(74) *Attorney, Agent, or Firm* — Kilpatrick Townsend & Stockton LLP

(57) ABSTRACT

A system and computer-implemented method for controlling a virtual avatar on an electronic device, the method comprising: providing a base model that defines a virtual avatar associated with a user; receiving input data from a plurality of input sources, wherein the plurality of input sources includes an imaging source configured to provide images of the user's face, wherein each of the plurality of input sources has an active state and an inactive state, and input data is only received from an input source in the active state; processing the input data; updating the base model in response to the processed input data to update at least one
(Continued)

property of the virtual avatar and rendering the updated base model to display the virtual avatar on a display screen.

20 Claims, 3 Drawing Sheets

(56)                    References Cited

U.S. PATENT DOCUMENTS

| | | | |
|---|---|---|---|
| 2014/0362294 A1* | 12/2014 | Majid ............... | H04N 21/4312 |
| | | | 348/564 |
| 2017/0039751 A1 | 2/2017 | Tong et al. | |
| 2018/0137678 A1 | 5/2018 | Kaehler | |
| 2019/0130629 A1 | 5/2019 | Chand | |
| 2019/0285881 A1 | 9/2019 | Ilic et al. | |
| 2021/0093967 A1 | 4/2021 | Hooks et al. | |
| 2021/0104100 A1* | 4/2021 | Whitney ................. | G06T 13/40 |
| 2021/0335004 A1* | 10/2021 | Zohar ...................... | G06T 7/74 |

OTHER PUBLICATIONS

Shigeo Morishima; "Real-time Voice Driven Facial Animation System;" IEEE SMC'99 Conference Proceedings. 1999 IEEE International Conference on Systems, Man, and Cybernetics (Cat. No. 99CH37028) (Year: 1999).*
Combined Search and Examination Report for UK Patent Application No. 2106038.9 issued Feb. 11, 2022, from the UK Patent Office.
International Search Report and Written Opinion in connection with corresponding PCT Application No. PCT/GB2022/051074, issued Feb. 26, 2022, from the EP Patent office.
EP22722333.6, "Office Action", Jul. 7, 2025, 8 pages.

* cited by examiner

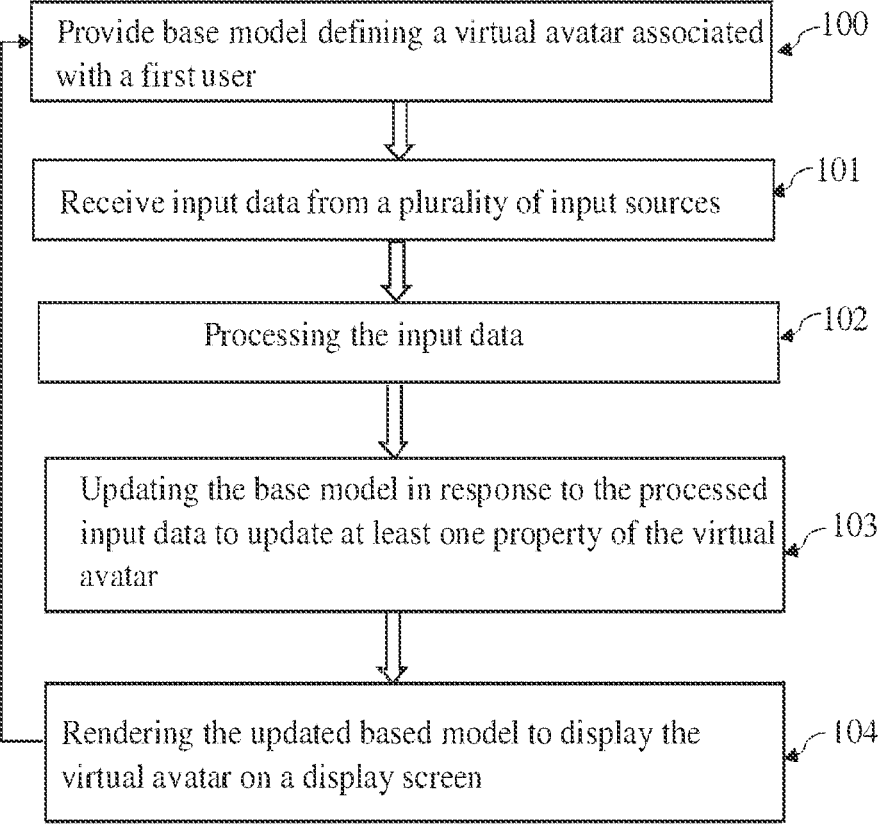

Provide base model defining a virtual avatar associated with a first user    ~100

Receive input data from a plurality of input sources    ~101

Processing the input data    ~102

Updating the base model in response to the processed input data to update at least one property of the virtual avatar    ~103

Rendering the updated based model to display the virtual avatar on a display screen    ~104

Figure 3

COMPUTER-IMPLEMENTED METHOD FOR CONTROLLING A VIRTUAL AVATAR

CROSS-REFERENCE TO RELATED APPLICATIONS

The present application is the U.S. National Stage application of International Application No. PCT/GB2022/051074, filed Apr. 28, 2022, which International Application was published on Nov. 3, 2022, as International Publication No. WO2022/229639. The International Application claims priority to British Patent Application No. 2106038.9, filed Apr. 28, 2021, the contents of which are incorporated herein by reference in their entireties.

FIELD OF THE INVENTION

The present specification relates to computer-implemented systems and methods for controlling a virtual avatar on an electronic device.

BACKGROUND

A virtual avatar is a graphical representation of a user's character on a digital platform. A virtual avatar can have a two-dimensional form (e.g. an image or icon) or a three-dimensional form (e.g. the character in a computer game).

It is known for virtual avatars to be customisable by the user. Advantageously, using a virtual avatar rather than an image or video of the user has allowed the user to maintain some anonymity in the digital world. The use of virtual avatars is not limited to gaming, as increasingly virtual avatars are being used to represent users in digital events, meetings, and in interactive training exercises.

As technology has progressed, virtual avatars have become more advanced and more life-like. However, there is still a need for an improved system and method for controlling a virtual avatar that is accurate, resilient and reduces the reliance of the system on certain devices, such as cameras.

SUMMARY

In a first aspect, the present disclosure provides a computer-implemented method for controlling a virtual avatar on an electronic device. The method comprises providing a base model that defines a virtual avatar associated with a user, receiving input data from a plurality of input sources, wherein the plurality of input sources includes an imaging source configured to provide images of the user's face, wherein each of the plurality of input sources has an active state and an inactive state, and input data is only received from an input source in the active state, processing the input data, updating the base model in response to the processed input data to update at least one property of the virtual avatar, and rendering the updated base model to display the virtual avatar on a display screen.

Advantageously, in the present disclosure input data is received from a plurality of sources, rather than just a single input source. This reduces the reliance of the method on particular input sources and improves resilience to network errors, or faults with particular input sources.

The plurality of input sources each have an active state and an inactive state, wherein input data is only received from the input source when it is in the active state. This means that input data is not necessarily received from all of the input sources all of the time. This also allows the system of the present invention to control when data is received from a given input source. Consequently, in the present disclosure input data can be selectively received from a large number of different input sources as and when required, without this potentially resulting in a large amount of (potentially superfluous) input data being received and requiring processing. Reducing the requirements of the processor (and other hardware components such as memory) can also reduce costs.

Optionally, at least one of the plurality of input source may be integral to the electronic device. In some embodiments, each of the input sources may be integral to the electronic device.

Optionally, updating the base model in response to the processed input data to update at least one property of the virtual avatar comprises updating at least one visual property of the avatar.

Optionally, the at least one property of the virtual avatar includes one or more of: position, rotation, appearance, facial expression, pose, or action.

The base model may store data defining the appearance of the virtual avatar in a neutral or expressionless state. The base model may define a 3D mesh representing the virtual avatar in the neutral or expressionless state.

Updating the base model may comprise using blend shape animation and/or or bone/rig animation. A plurality of blend shapes may be stored in a memory, wherein each blend shape may define a different facial expression, such that the blend shape can be used to update the facial expression of the virtual avatar.

The base model may comprise positional data, rotational data, and blend shape values that define the virtual avatar. A plurality of animations for the virtual avatar may be stored in a memory, wherein each animation is defined by a set of blend shape values, positions and rotations.

The input data may be aggregated to update the base model. Optionally, each of the input sources has the same weight in terms of aggregating the input data. In some embodiments, certain input sources may have a higher weighting than other input sources.

The method may include controlling which of the plurality of input sources are in the active state and which of the plurality of input sources are in the inactive state.

If an input source is in the inactive state this does not necessarily mean that the input source is switched off, just that data is not received from the input source. However, if an input source is switched off then it will be in the inactive state.

The imaging source may be a camera. Optionally, if the imaging source is in the inactive state, the method includes moving one or more of the other input sources into the active state. Optionally, in response to no input data being received from the imaging source, the method includes moving one or more of the other input sources into the active state.

Optionally, the imaging source may be in, or may be moved to, the inactive state if is determined that the imaging source is not capturing images of the user's face.

A default state for one or more of the plurality of input sources may be the inactive state.

Each of the plurality of input sources may be assigned a priority value. For example, priority value=1, priority value=2, priority value=3, etc. For input sources with a priority value of 1 (highest priority) the default state may be the active state. Optionally, the weighting allocated to an input source when aggregating the input data may be dictated by the priority value assigned to the input source.

The imaging source may be assigned the highest priority value (e.g. priority value=1). Optionally, an audio input may be assigned the second highest priority value (e.g., priority value=2). If one or more of the highest priority (priority value=1) input sources are determined to be in the inactive state, then one or more of the input sources having the next highest priority value (priority value=2) may be moved into the active state. This may be controlled using fall-back logic.

Optionally, if the imaging source is in the inactive state or no input data is received from the imaging source, the virtual avatar may enter an idle state. In the idle state the method may comprise animating the virtual avatar to execute a predetermined idle animation sequence. In some embodiments, the predetermined idle animation sequence is an animation of the avatar blinking and waiting. The predetermined idle animation sequence may be looped or repeated until additional input data is received.

Optionally, the method may include initiating the predetermined idle animation sequence if any of the input sources having the highest priority value (priority value=1) are determined to be in the inactive state.

Optionally, the method may include updating or supplementing the predetermined idle animation sequence in response to input data received from one or more of the plurality of input sources.

The plurality of input sources may include past avatar data stored in a memory. The past avatar data may include data related to at least one previous version of the virtual avatar associated with the user. The memory may also store past input data received from one or more of the other input sources.

The plurality of input sources may include an audio input configured to capture audio from a user. The audio input may be a microphone.

Optionally, the default state of the audio input may be the inactive state. The audio input may be moved to the active state in response to no input data being received from the imaging source, or determining that the imaging source is in the inactive state.

Processing the input data may comprise determining the volume of the audio captured by the audio input. Updating the base model may comprise moving or altering at least one of a mouth, jaw, or other facial features of the virtual avatar depending on the determined volume.

Optionally, processing the input data comprises converting the captured audio into text and the method further comprises displaying the text on the display screen. Thus, the method may include a speech-to-text function.

Optionally, the plurality of input sources includes a user interface device. The user interface device may be a touchscreen, a controller, a keypad, a mouse, or any other device for receiving an input from the user.

The method may comprise receiving a user input from the user interface device and updating the base model to animate the virtual avatar to execute a predetermined user event animation associated with the user input.

Optionally, processing the input data comprises applying facial tracking to the images captured by the imaging source to determine the user's facial expression. Updating the base model may comprise altering the facial expression of the virtual avatar to mimic, or respond to, the user's facial expression.

Optionally, the input data comprises gameplay data from a game the user is playing on the electronic device, or on another electronic device in communication with the electronic device. For example, the other electronic device may be a gaming console, smart watch, TV, PC or other device that may be in communication with the user's electronic device.

The plurality of input sources may include a user electronic device, or a game or application executed on such an electronic device, or a network connection with a remote electronic device.

In some embodiments the gameplay data may comprise an indication that an event or result has occurred in the game being played by the user.

The method may comprise transmitting a notification to the electronic device in response to one of a plurality of triggers occurring in the game. Updating the base model may comprises animating the virtual avatar to execute a predetermined gameplay event animation associated with the user input, and/or displaying an object or animation on the display screen in addition to the virtual avatar.

For example, the trigger may include (but is not limited to), good performance, excellent performance, victory, loss, player introduction, match starting, match ending, player moves such as hit or block, super combo, user status, etc.

The predetermined gameplay animation may include updating the emotion of the virtual avatar, or instructing the virtual avatar to execute a certain action, such as fall over, salute, high five, celebrate or dance. The predetermined gameplay animation may include displaying confetti, an explosion or lightning on the display screen in addition to the virtual avatar.

The method may include displaying a second virtual avatar on the display screen, wherein the second virtual avatar is associated with a second user. Optionally, the second user is remote to the first user. This may be referred to as a remote user.

Optionally the method further comprises establishing a communication channel between the user's electronic device and a second electronic device associated with the second user, receiving output avatar data defining the second virtual avatar over the communication channel from the second electronic device, and rendering the second virtual avatar on the display screen.

The method may include providing a base model that defines the second virtual avatar associated with the second user. The output avatar data defining the second virtual avatar may include instructions for retrieving and/or updating the base model defining the second virtual avatar. For example, the output avatar data may include input data received by the second electronic device.

Optionally, in response to input data received from the user or output data received from the second user, the method further comprises updating the base model such that the user's virtual avatar interacts with the second virtual avatar on the display screen. For example, using the user input device the user may be able to instruct their virtual avatar to high-five or otherwise interact with the second virtual avatar. However, the input data may be received from any of the plurality of input sources or the output data.

In a second aspect, the disclosure provides an electronic device configured to carry out the method of any of the embodiments or examples recited in the first aspect of the disclosure.

The electronic device may comprise a processor and memory. The memory may comprise a set of executable instructions to cause the processor to carry out the method of the present disclosure.

The processor may comprise a face tracking processor configured to track the user's face by analysing the images provided by the imaging source.

The electronic device may be a handheld electronic device.

Optionally, the electronic device may be a smartphone. The smartphone may comprise at least one of the plurality of input sources. In other words, at least one of the plurality of input sources may be integral to the smartphone.

In a third aspect, the disclosure provides a system comprising a first electronic device as described above, the first electronic device associated with a first user, and a second electronic device as described above, wherein the second electronic device is associated with a second user remote to the first user, wherein the system is configured to establish a communication channel between the first electronic device and the second electronic device.

It will be appreciated that the third aspect of the invention may comprise any embodiment or example of the first or second aspects of the invention.

Optionally, the second electronic device is configured to transmit data to the first electronic device at (or after) a predetermined time interval.

Optionally, the first electronic device is configured to transmit data to the second electronic device at (or after) a predetermined time interval.

It will be appreciated that in the present disclosure the term computing device may be used interchangeably with the term electronic device.

In some embodiments, the predetermined time interval may be around 30 ms.

BRIEF DESCRIPTION OF THE DRAWINGS

Illustrative embodiments of this disclosure will be described hereinafter, by way of example only, with reference to the accompanying drawings in which like reference signs relate to like elements and in which:

FIG. 3 is a flowchart of a method according to an embodiment of the present disclosure.

DETAILED DESCRIPTION

Figure 1:
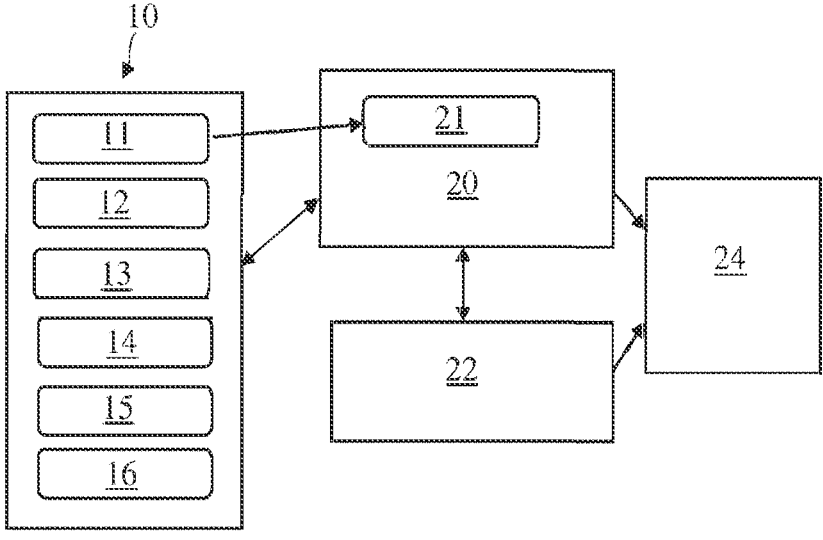
FIG. 1 shows a schematic illustration of a system according to an embodiment of the present disclosure.

FIG. 1 is a diagram representing a system for controlling at least one virtual avatar in accordance with an embodiment of the present disclosure. The system includes a plurality of input sources 10. Each of the plurality of input sources may have an active state and an inactive state. In the active state the input source is configured to transmit input data to a processor 20. The system (e.g. the processor 20) can control which of the input sources is in an active state and which is in an active state. This may be done using fall-back logic.

The processor 20 is configured to process the input data received from the plurality of input sources 10. The processor 20 is in communication with memory or storage device 22.

The memory or storage device 22 and the processor 20 are both in communication with a display screen 24 on which the virtual avatar is displayed.

Figure 2:
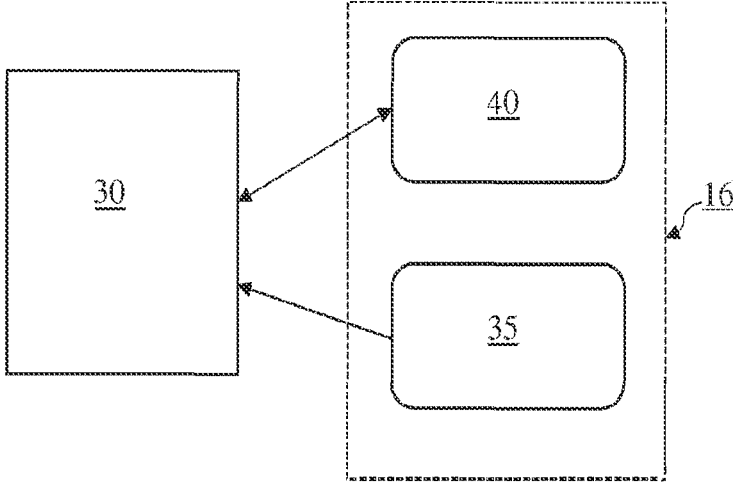
FIG. 2 shows a schematic illustration of a system according to another embodiment of the present disclosure.

An electronic device 30, such as a smartphone, may comprise the display screen 24, processor 20, memory 22 and at least one of the plurality of input sources (see FIG. 2).

The memory or storage device 22 is configured to store the base model that defines a virtual avatar associated with the user, and a set of instructions configured to be executed by the processor 20. The processor is configured to update the base model in response to the processed input data to update at least one property of the virtual avatar.

The at least one property of the virtual avatar may include one or more of: position, rotation, appearance, facial expression, pose, or action.

The virtual avatar may be defined in the base model by a series of blend shape values, rotations, positions and poses. The base model may define the virtual avatar in a neutral or expressionless state. Updating the base model may comprise blending or updating at least one of the blend shape values for the virtual avatar, and/or updating the avatar pose or position.

Thus, the base model may be a data structure which stores a default avatar mesh and default values for the blend shapes and avatar specific parameters (such as retargeting recipe, retargeting blend shapes index, animations, etc.). The data structure can be written in any programming language.

The processor 20 may be configured to aggregate the input data from the plurality of input sources 10. Each of the plurality of input sources 10 may be allocated the same weight by the processor 20 when aggregating the input data. In other embodiments, the input sources 10 may be allocated different weights when aggregating the input data, to select how much influence a particular input source has on the avatar.

A plurality of predetermined animations or animations sequences, and/or poses and/or emotions may be stored in the memory 22 for a given virtual avatar.

In some embodiments, the memory 22 may be considered to be one of the plurality of input sources 10. The memory 22 may store past avatar data, for example including previous avatar blend shape values and previous avatar positions. The past data may be used to blend the blend shape values and/or avatar pose when rendering or updating the virtual avatar.

Optionally, if facial tracking is lost (which is described below) because no data is received from the imaging source 11, then using the past data as an input source may allow the avatar to be updated or animated in the idle avatar state (see FIG. 4). Thus, the past data may be used as a back-up input source, to ensure that there is a more seamless or continuous control of the avatar.

Optionally, the processor 20 can change the weight allocated to the past data when aggregating the input data, to choose how much influence the past data has for the current data. For example, the weight allocated to the past data may increase if the imaging source(s) 11 are in the inactive state.

In this embodiment, the plurality of input sources 10 comprises an imaging source 11, an audio input 12, a user interface device 13, an AI input 14, local application 15, and a network connection 16.

Facial Tracking

The imaging source 11 may be a camera configured to capture images of a user's face. The imaging source may be integral to the user's electronic device 30. A default state of the imaging source may be the active state. The imaging source 11 is in communication with a face tracking system 21, which forms part of the processor 20. The face tracking system 21 is configured to apply facial tracking techniques to the images captured by the imaging source 11. The face tracking system 21 may be configured to determine the user's facial expression from the images provided. The processor 20 may then wherein update the base model to alter the facial expression of the virtual avatar either to mimic, or to respond to, the user's determined facial expression. For example, if the face tracking system 21 determines that the user has raised their eyebrows, the virtual avatar may be updated to have raised eyebrows.

The facial tracking system 21 may apply a 3D mesh, or a 3D mesh mask, to the captured images of the user's face. The 3D mesh may be constructed from a plurality of markers located at key facial landmarks of the user's face. The facial tracking system 21 may track movement of the 3D mesh, or the facial landmarks, to track changes in the user's facial expression.

The virtual avatars, or the virtual avatar's face, may also be defined by a 3D mesh or 3D mesh mask. Thus, changes to the 3D mesh of the user's face may be mapped onto (or mirrored by) the 3D mesh defining the virtual avatar.

There are several known techniques for facial animation: blend shape (also known as morph target) animation; bone or ring animation; texture based animation; and physiological animation.

Physiological animation is where bone, tissue and skin are simulated to enable realistic animations. This is generally too complex and heavyweight to use in a real time animation executed on mass market consumer electronic devices, rather than specialist equipment.

The present disclosure may use a combination of blend shape facial animation and rigged facial animation techniques. This is described in more detail below.

Blend shape based facial tracking is an industry standard animation technique with extremely high fidelity. Blend shape animation is particularly useful for facial animation as it reduces the number of joints needed to define a face.

In blend shape animation, the virtual avatar to be animated is first modelled with a neutral expression. The is done using a 3D mesh, and the vertex positions of the mesh are stored.

This may be the base model. A library of blend shapes is provided, wherein each blend shape contains a series of vertex positions that represents a different facial expression. The library of blend shapes may be stored in the memory 22.

When the facial tracking system 21 determines that the user's facial expression has changed (i.e. at least one of the facial landmarks has moved), this can trigger the corresponding blend shape for that facial expression to be retrieved from the library. The base model (e.g. base mesh) of the virtual avatar can then be updated by blending the base model with the selected blend shape.

An advantage of blend shape facial animation is that one expression value can work for multiple virtual avatars, both human and non-human characters. Blend shape animation is also supported across multiple technologies.

Rigged animation (also known as joint based facial tracking, or skeletal animation) is where facial expressions are created in real time by translating joints on the virtual avatar. This is a standard industry technique. In some embodiments of the present disclosure, the neck, jaw and eyes of the virtual avatar may be controlled using rigged animation, whilst the rest of the virtual avatar may be controlled using blend shape animation. It will be appreciated that in some embodiments, the virtual avatar may only comprise a head (i.e. neck upwards), and in other embodiments, the virtual avatar may have a whole body.

Other Input Sources

The audio input 12 is configured to capture audio from the user. The audio input 12 may be a microphone. The audio input 12 may be integral to the user's electronic device 30, or alterative the audio input 12 may be external to the electronic device 30. Optionally, the default state of the audio input 12 may be the inactive state. As such, input data may not be transmitted from the audio input to the processor 20 until the processor 20 activates the audio input 12. In some embodiments, the audio input 12 may be moved to the active state if no input data is received from the imaging source 11, or in response to the imaging source 11 being in the inactive state. The audio input 12 may only be moved to the active state when the avatar enters an idle state (discussed below in relation to FIG. 4).

When the audio input 12 is in the active state, the processor 20 may be configured to determine the volume (loudness) of the captured audio. The base model may be updated to control the avatar based on the determined volume of the captured audio. In some embodiments, the base model is updated to move or alter at least one of a mouth, jaw, or other facial feature of the virtual avatar depending on the determined volume. This may give the appearance that the virtual avatar is 'tracking' the user's face, even though the face tracking system 21 is inactive due to the lack of images provided by the imaging source 11.

In some embodiments, the processor 20 may be configured to provide a speech-to-text function, when the audio input is in an active state. The processor 20 may comprise speech recognition software. The processor 20 may analyse the captured audio transmitted by the audio input 12 to determine what the user is saying and convert this into text. The text may displayed on the display screen 24, for example in a speech bubble next to the virtual avatar. A number of different 'off the shelf' speech-to-text frameworks are available, which could be used in the present system. It may be preferable for the speech-to-text functionality to be activated or disabled by the user.

The user interface device 13 may be a controller, keypad, keyboard, mouse, touchscreen or other device for receiving an input from a user. An input from the user interface device 13 may trigger a pose, action, particle, animation, or facial expression of the virtual avatar that is associated with the input. For example, if the user pushes a certain button on the user interface device 13 this may cause the virtual avatar to wave, or celebrate, or a text bubble may be displayed, or a particle effect such as falling confetti may be triggered.

A list or table of inputs from the user interface device 13 and the associated virtual avatar response or particle effect may be stored in the memory 22. The user may be able to customise this list or table.

Optionally, some inputs from the user interface device 13 may require a second user to be present in order to trigger an event or effect.

Some other inputs associated with a data model, such as the base model, for one or more users are discussed in more detail below.

In the gaming industry it is known for artificial intelligence (AI) to be used to generate responsive, or adaptive behaviours in non-player characters (NPCs). This can be referred to as "game AI". The plurality of input sources 10 may comprise an AI input 14, which may be a "game AI" input. The AI input 14 may receive data from one or more of the other input sources 10 and/or from the processor 20. The AI input 14 may comprise a set of algorithms and, in response to the data received, the AI input 14 may output instructions that cause the base model to be updated. The AI input 14 may instruct the base model to be updated such that the avatar executes a certain animation sequence or displays a certain facial expression.

For example, if input data received from the plurality of input sources 10 cause the base model to update the blend shape values of the avatar to display a sad emotion, the AI input 14 may be programmed to trigger a crying animation after the sad emotion has been displayed for a given time period. Thus, the AI input 14 may allow for a greater range of animations and control of the avatar and may supplement the response triggered by the other input sources 10.

In other embodiments, the AI input 14 may involve machine learning, rather than being a "game AI". Thus, the AI input 14 may be provided from another data model such as an Artificial Neural Network (ANN) and, in some cases, a convolutional neural network (CNN).

ANNs (including CNNs) are computational models inspired by biological neural networks and are used to approximate functions that are generally unknown. ANNs can be hardware (neurons are represented by physical components) or software-based (computer models) and can use a variety of topologies and learning algorithms. ANNs can be configured to approximate and derive functions without a prior knowledge of a task that is to be performed and instead, they evolve their own set of relevant characteristics from learning material that they process. A convolutional neural network (CNN) employs the mathematical operation of convolution in in at least one of their layers and are widely used for image mapping and classification applications.

In some examples, ANNs usually have three layers that are interconnected. The first layer may consist of input neurons. These input neurons send data on to the second layer, referred to a hidden layer which implements a function and which in turn sends output neurons to the third layer. With respect to the number of neurons in the input layer, this may be based on training data or reference data relating to traits of an avatar provided to train the ANN for detecting similar traits and modifying the avatar accordingly.

The second or hidden layer in a neural network implements one or more functions. There may be a plurality of hidden layers in the ANN. For example, the function or functions may each compute a linear transformation of the previous layer or compute logical functions. For instance, considering that an input vector can be represented as x, the hidden layer functions as h and the output as y, then the ANN may be understood as implementing a function of using the second or hidden layer that maps from x to h and another function g that maps from h to y. So, the hidden layer's activation is f(x) and the output of the network is g(f(x)).

In some examples, in order to train the ANN to detect a characteristic associated with a feature of interest pertaining to an avatar, such as a frown, raised hand, tossing of the head to say yes or no etc, the following information may need to be provided to the data model:

(i) a plurality of training media files such as an image or sound, each training media file having one or more traits of a certain type;

(ii) for a given training media file among said plurality: one or more training inputs, such as a label for a feature of interest, associated with the given input; and a training output identifying a specific type of trait, such as a particular static or dynamic attribute to be applied to the avatar that is associated with the feature of interest, i.e. a representation of the trait pertaining to the label.

In one example, a training image used to train the ANN may be a red face with a frown, for which a training input may be a graph or similar representing a path taken by a facial tracking module associated with a frown to represent anger. The training output may then be a trigger or executable instructions for the avatar to present a red angry face for that for that input path.

After sufficient instances, the model may then be trained to automatically detect the feature of a facial tracking path for a frown and automatically apply a classification, for instance, "this is recognised as anger" and then instruct the base model to update the avatar to apply the angry face for any new live or real time input that contains is similar to the feature of interest.

It will be appreciated that the AI input 14 could comprise elements of both "game AI" and machine learning, as described above.

The local application 15 is an application or program running on the user's electronic device 30 that is configured to provide input data to the processor 20. For example, the local application 15 may be a weather application, which may transmit an indication of the current weather to the processor 20. If the weather is sunny, the virtual avatar may be updated to be happy, or to wear sunglasses, or an indication of the weather may be displayed as a background on the display screen. The local application 15 may be any kind of application that may provide useful data to the processor 20, such as data about the user's behaviour, current mood, current activity, or environment.

As shown in FIG. 2, the network connection 16 may be a communication channel between the user's electronic device (e.g. the processor 20) and an additional electronic device 35 associated with the user. The additional electronic device 35 may be a gaming console, PC, tablet, smart watch, TV, or smartphone. The additional electronic device 35 may be associated with the user. As described above in relation to the local application 15, the additional electronic device 35 may be configured to transmit data to the processor 20 via the network connection 14. The data transmitted over network 14 may be notifications or data about the user's behaviour, current mood, current activity, or environment.

In some embodiments, the user may be playing a game on the additional electronic device 35. Thus, the network connection 16 may be configured to transmit game play data to the processor 20. Alternatively, if the user is playing a game on the electronic device 30 (rather than the additional electronic device 35), game play data may be transmitted from the local application 15 to the processor 20.

A given event or result in the game being played, either on the user's electronic device 30 or the additional electronic device 35, may trigger a notification to be output to the processor 20. The notification may be associated with a pose, action, particle, animation, emotion, or facial expression of the virtual avatar. For example, if the user wins the game this may cause the virtual avatar to celebrate, or a particle effect such as falling confetti may be triggered. If the user gets hit by something in the game, an explosion may be displayed on the screen.

A list or table of trigger events, or game play notifications, from the network input 16 or the local application 15, and the associated virtual avatar response or particle effect may be stored in the memory 22. The user may be able to customise this list or table.

Thus, gameplay events may influence the virtual avatar behaviour.

It will be appreciated that more than one virtual avatar may be rendered and displayed on the screen 24 at a given time. The users may be remote users or local users. For each local user, the process is as described above. A profile may be created for each local user, such that each of the plurality of input sources 10, including a given user interface device 13, imaging source 11, audio input 12, and network connection 14, may be associated with a particular local user.

The local avatars may also be referred to as tracked avatars, as the face tracking system 21 is used to update or control these avatars.

For a remote user, the processor 20 does not receive input data from a plurality of input sources associated with the remote user. Thus, remote avatars are rendered and controlled using a different process compared to local avatars. The face tracking system 21 is not used for remote avatars. Instead, for remote avatars, as shown in FIG. 2, the network connection 16 may be configured to transmit output avatar data from the remote user's electronic device 40 to the processor 20. The output avatar data allows the remote avatar to be rendered and displayed on the screen 24, together with the local user(s) avatars.

The output avatar data may include the face tracking data from the face tracking system 21 on the remote electronic device 40. An example of the format of a portion of output avatar data is as follows:

Public float [ ] BlendShapeWeights;
Public Vector3 HeadPosition;
Public Quaternion HeadRotation;
Public Vector3[ ] EyePositions;
Public Quaternion [ ] EyeRotations;

Equivalently, the user's virtual avatar may be displayed on the remote user's electronic device 40 as a remote avatar. As such, there is a two-way communication channel between the user's electronic device 30 and the remote (or second) electronic device 40. The network connection 16 may comprise a peer-to-peer (p2p) connection between the user's electronic device 30 and the remote electronic device 40.

The output avatar data used to render the remote avatar may be transmitted over the network connection 16 after predetermined time intervals. For example, data may be sent over the network connection 16 every 30 ms. This may improve reliability of the network connection 16 by reducing the bandwidth required compared to sending output avatar data more frequently, e.g. every frame.

The network connection 16 may transmit audio to and/or from the remote user and the local user.

The local avatars, or the local and remote avatars, may be configured to interact with each other on the display screen 24.

In some embodiments, certain inputs from the plurality of input sources 10 may trigger the user's virtual avatar to interact with either another local avatar or a remote avatar. For example, the input triggering the interaction may be from one of the user interface devices 13, the local application 15, or the network connection 16. Thus, in some embodiments the trigger may be a local user input, or a remote user input, or gameplay data.

The remote user may be able to trigger interactions between their virtual remote avatar and the user's virtual avatar on the display screen 24. The interactions may be sent (e.g. as instructions) through the network connection 16. Interactions that result in animations affecting the local avatar's blend shape values may be input to the processor 20 as local avatar face tracking and pose information.

Examples of interactions between two avatars that may be associated with given inputs are: a high-five, hug, wave or greeting between the avatars.

An embodiment of a method for controlling a virtual avatar, to be executed by the system described above, is shown in the flowchart in FIG. 3.

In step 100, the base model defining a virtual avatar associated with a first (local) user is provided. This may be stored in the memory 22.

In step 101, input data is received from a plurality of input sources 10. Input data is only received from input sources that are in an active state.

In step 102, a processor 20 processes the input data. This may involve aggregating the input data.

In step 103, the base model is updated in response to the processed input data to update at least one property of the virtual avatar. For example, at least one blend value, position or rotation of the virtual avatar may be updated. The virtual avatar may be updated to follow an animation sequence.

The updated base model is then rendered, and the virtual avatar is displayed on a display screen (step 104).

Figure 4:
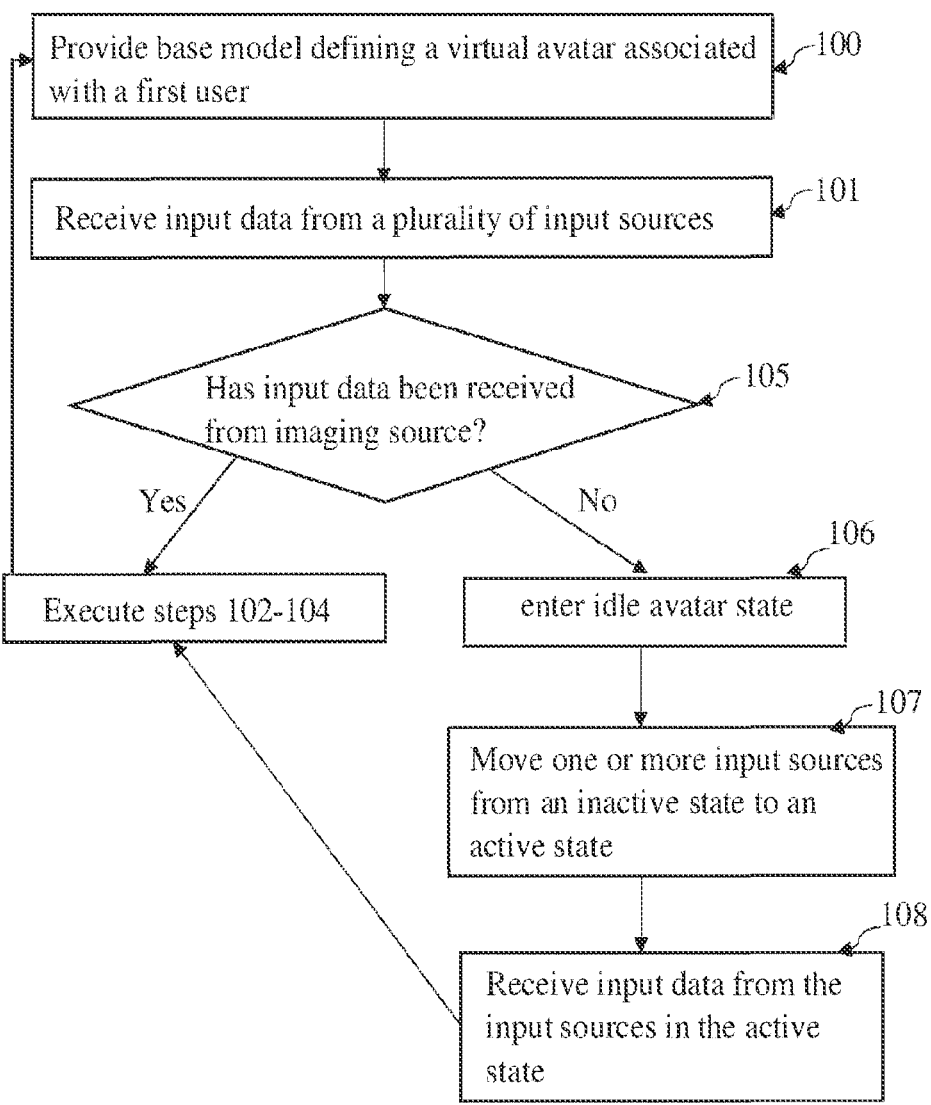
FIG. 4 is a flowchart of another method according to an embodiment of the present disclosure.

As shown in FIG. 4, after step 101 the processor may determine whether any input data has been received from any of the imaging sources 11 associated with the first (local) user (step 105). If the answer is yes, input data (i.e. images or imaging data) has been received, then the method may continue as shown in FIG. 3 (steps 102-104).

If no input data has been received from the imaging source(s), then the user's virtual avatar may be instructed to enter an idle avatar state (step 106). In the idle avatar state the user's virtual avatar may be configured to execute a predetermined idle animation sequence. The predetermined idle animation sequence may be the avatar blinking and waiting, or looking around the screen. The predetermined idle animation sequence may be looped until further input data is received.

Once the avatar is in the idle state, one or more input sources may be moved from an inactive state to an active state (step 107). Not all of the plurality of input sources may be in the active state at a given time. One or more of the input sources may have a default state which is the inactive state. These input sources may be used as secondary or back-up sources in the event that the imaging source (or other primary input source) is inactive or no responsive. For example, step 107 may involve activating an audio input 12 configured to capture audio from the user, or a local application 15 or other input source may be activated to provide an input to the processor 20.

In step 108, input data is received from the input sources in the active state. The method then proceed to process the input data, update and render the virtual avatar, as per steps 102-104 in FIG. 3.

In some embodiments, the predetermined idle avatar sequence may be looped until (at step 105) it is determined that input data is received from one of the imaging sources 11 associated with the user. The predetermined idle avatar sequence may be supplemented or updated by the inputs data from the active input sources (step 108). In other embodiments, the predetermined idle avatar sequence may be terminated in response to receiving input data from one of the active input sources (step 108).

Although particular embodiments of this disclosure have been described, it will be appreciated that many modifications/additions and/or substitutions may be made within the scope of the claims.

The invention claimed is:

1. A computer-implemented method for controlling a virtual avatar on an electronic device, the method comprising:

providing a base model that defines a virtual avatar associated with a user;

receiving input data from at least one of a plurality of input sources, wherein the plurality of input sources includes an imaging source configured to provide images of the user's face, wherein each of the plurality of input sources has an active state and an inactive state, and input data is only received from an input source in the active state;

processing the input data;

updating the base model in response to the processed input data to update at least one property of the virtual avatar; and rendering the updated base model to display the virtual avatar on a display screen;

wherein if the imaging source is in the inactive state, or in response to no input data being received from the imaging source, the method includes moving one or more of the other input sources into the active state.

2. The computer-implemented method of claim 1, wherein the at least one property of the virtual avatar includes one or more of: position, rotation, appearance, facial expression, pose, and action.

3. The computer-implemented method of claim 1, wherein the plurality of input sources further comprises one or more of:

an audio input configured to capture audio from a user;

a user input device;

a user interface device;

a user electronic device;

a network connection to an electronic device;

a game executed on an electronic device;

an application executed on an electronic device; and an artificial intelligence, AI, and game AI.

4. The computer-implemented method of claim 1, wherein the plurality of input sources comprises a memory, the memory comprising data related to at least one of the virtual avatar and at least one previous version of the virtual avatar, associated with the user.

5. The computer-implemented method of claim 4, further comprising storing in the memory at least one of:

the updated base model and data defining the updated base model; and at least a portion of the input data, and processed input data.

6. The computer-implemented method of claim 1, wherein if the imaging source is in the inactive state, the virtual avatar enters an idle state, wherein in the idle state the method comprises animating the virtual avatar to execute a predetermined idle animation sequence.

7. The computer-implemented method of claim 6, comprising updating the predetermined idle animation sequence in response to input data received from one or more of the plurality of input sources.

8. The computer-implemented method of claim 1, wherein each of the plurality of input sources are assigned a respective priority value, and wherein processing the input data comprises weighting input data received from each input source according to the respective priority value of the input source.

9. The computer-implemented method of claim 1, wherein each of the plurality of input sources are assigned a respective priority value and the imaging source is assigned the highest priority value, and wherein:

moving one or more of the other input sources into the active state comprises moving one or more of the input sources having a second highest priority value into the active state.

10. The computer-implemented method of claim 8, wherein the plurality of input sources includes an audio input configured to capture audio from a user, wherein the audio input is assigned the second highest priority value.

11. The computer-implemented method of claim 1, wherein the plurality of input sources includes an audio input configured to capture audio from a user, and wherein at least one of:

processing the input data comprises determining the volume of the audio captured by the audio input, and updating the base model comprises at least one of moving and altering at least one of a mouth, jaw, and facial feature of the virtual avatar depending on the determined volume; and processing the input data comprises converting the captured audio into text and the method further comprises displaying the text on the display screen.

12. The computer-implemented method of claim 1, wherein processing the input data includes processing at least a portion of the input data using an Artificial Intelligence (AI) input, the AI input comprising a set of algorithms to output instructions that cause the base model to be updated.

13. The computer-implemented method of claim 1, wherein the plurality of input sources includes a user interface device, and the method comprises:

receiving a user input from the user interface device; and updating the base model to animate the virtual avatar to execute a predetermined user event animation associated with the user input.

14. The computer-implemented method of claim 1, wherein processing the input data comprises applying facial tracking to the images captured by the imaging source to determine the user's facial expression, wherein updating the base model comprises altering the facial expression of the virtual avatar one of to mimic and in response to, the user's facial expression.

15. The computer-implemented method of claim 1, wherein the input data comprises at least one of: gameplay data from a game the user is playing on the electronic device and gameplay data from a game the user is playing on another electronic device which is in electronic communication with the electronic device.

16. The computer-implemented method of claim 15, comprising transmitting a notification to the electronic device in response to one of a plurality of triggers occurring in the game, wherein updating the base model comprises:

animating the virtual avatar to execute a predetermined gameplay event animation associated with the user input; and displaying at least one of an object and an animation on the display screen in addition to the virtual avatar.

17. The computer-implemented method of claim 1, further comprising displaying a second virtual avatar on the display screen, wherein the second virtual avatar is associated with a second user.

18. The computer-implemented method of claim 17, further comprising:

establishing a communication channel between the user's electronic device and a second electronic device associated with the second user;

receiving output avatar data defining the second virtual avatar over the communication channel from the second electronic device; and rendering the second virtual avatar on the display screen.

19. The computer-implemented method of claim 18, wherein in response to at least one of input data received from the user and output data received from the second user, the method further comprises updating the base model such that the user's virtual avatar interacts with the second virtual avatar on the display screen.

20. An electronic device configured to carry out the method of claim 1.

\* \* \* \* \*